United States Patent
Chen et al.

(10) Patent No.: US 12,086,049 B2
(45) Date of Patent: Sep. 10, 2024

(54) RESOURCE CAPACITY MANAGEMENT IN COMPUTING SYSTEMS

(71) Applicant: Microsoft Technology Licensing, LLC, Redmond, WA (US)

(72) Inventors: Jieqiu Chen, Redmond, WA (US); Yow-Gwo Wang, Portland, OR (US); Qizhi Xu, Bergenfield, NJ (US); Feiyue Jiang, Suzhou (CN); Harsh Mahendra Mehta, Sammamish, WA (US); Boon Yeap, Redmond, WA (US); Dimple Kaul, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 17/565,680

(22) Filed: Dec. 30, 2021

(65) Prior Publication Data

US 2023/0214308 A1    Jul. 6, 2023

(51) Int. Cl.
*G06F 9/46* (2006.01)
*G06F 9/50* (2006.01)
*G06F 11/34* (2006.01)

(52) U.S. Cl.
CPC .......... *G06F 11/3442* (2013.01); *G06F 9/505* (2013.01)

(58) Field of Classification Search
CPC .............................. G06F 11/3442; G06F 9/505
See application file for complete search history.

(56) References Cited

U.S. PATENT DOCUMENTS

| | | |
|---|---|---|
| 2014/0310235 A1 | 10/2014 | Chan et al. |
| 2020/0218571 A1 | 7/2020 | Chen |
| 2020/0285525 A1 | 9/2020 | Agarwal et al. |

FOREIGN PATENT DOCUMENTS

CN    111767198 A    10/2020

OTHER PUBLICATIONS

Brownlee, Jason, "Deep learning for time series forecasting: predict the future with MLPs, CNNs and LSTMs in Python", In Machine Learning Mastery, Aug. 30, 2018, 574 Pages.
Hixson, et al., "Capacity Planning", In Journal of Login, Violume 40, Issue 1, Feb. 2015, pp. 32-38.
Hyndman, et al., "Forecasting: principles and practice, 2nd edition", In Publication of OTexts., May 8, 2018, 505 Pages.

(Continued)

*Primary Examiner* — Gregory A Kessler
(74) *Attorney, Agent, or Firm* — Schwegman Lundberg & Woessner, P.A.

(57) ABSTRACT

Techniques for capacity management in computing systems are disclosed herein. In one embodiment, a method includes analyzing data representing a number of enabled users or a number of provisioned users to determine whether the analyzed data represents an anomaly based on historical data. The method can also include upon determining that the data represents an anomaly, determining a conversion rate between a change in the number of enabled users or the number of provisioned users and a change in a number of active users of the computing service and deriving a future value of the number of active users of the computing service based on both the detected anomaly and the determined conversion rate. The method can further include allocating and provisioning an amount of the computing resource in the distributed computing system in accordance with the determined future value of the active users of the computing resource.

20 Claims, 9 Drawing Sheets

(56) References Cited

OTHER PUBLICATIONS

Killick, et al., "changepoint: An R Package for Changepoint Analysis", In Journal of Statistical Software, vol. 58, Issue 3, Jun. 2014, pp. 1-19.
Kocaoglu, et al., "Demand Forecast, Up-to-date Models, and Suggestions for Improvement an Example of a Business", In Journal of Global Strategic Management, vol. 8, Issue 1, Jun. 2014, 13 Pages.
Liu, et al., "Isolation Forest", In Proceedings of eighth IEEE international conference on data mining, Dec. 15, 2018, 10 Pages.
Lundberg, et al., "A unified approach to interpreting model predictions", In Proceedings of the 31st international conference on neural information processing systems, Dec. 4, 2017, 10 Pages.
Michna, et al., "The impact of lead time forecasting on the bullwhip effect", In Repository of arXiv preprint arXiv:1309.7374, Sep. 27, 2013, 25 Pages.
Montero-Manso, et al., "FFORMA: Feature-based forecast model averaging", In International Journal of Forecasting, Jan. 1, 2020.
Noumir, et al., "On Simple One-Class Classification Methods", In Proceedings of Proc. IEEE International Symposium on Information Theory, Jul. 1, 2012, 6 Pages.
Pedregosa, et al., "Scikit-learn Machine Learning in Python", In Journal of Machine Learning Research vol. 12, Oct. 2011, pp. 2825-2830.
Rousseeuw, et al., "A Fast Algorithm for the Minimum Covariance Determinant Estimator", In Journal of Technometrics, vol. 41, issue 3, Aug. 1, 1999, 31 Pages.
Salian, Shilpashree Dayananda, "Reducing Inventory and Optimizing the Lead time in a Custom order, High model mix Environment", In Master Thesis of Malardalen University, Jan. 1, 2016, 62 Pages.
Smyl, Slawek, "A hybrid method of exponential smoothing and recurrent neural networks for time series forecasting", In International Journal of Forecasting, vol. 36, Issue 1, Jan. 1, 2020, 27 Pages.
Taylor, et al., "Forecasting at Scale", In the American Statistician, vol. 72, Issue 1, Jan. 2, 2018, 25 Pages.
"International Search Report and Written Opinion Issued in PCT Application No. PCT/US22/044048", Mailed Date: Dec. 23, 2022, 15 Pages.

RESOURCE CAPACITY MANAGEMENT IN COMPUTING SYSTEMS

BACKGROUND

Cloud computing allows sharing of computing resources to multiple users or tenants via a computer network, such as the Internet. The shared computing resources can include compute, communications, storage, or other resources provided by one or more datacenters or other distributed computing systems. In such datacenters, routers, switches, bridges, load balancers, and other network devices interconnect large numbers of servers. Each of the servers can host multiple virtual machines, containers, virtual switches, or other virtualized components cooperating with one another to deliver various computing resources as cloud services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud service providers utilizing remote servers, storage devices, and other interconnected computing resources can provide users with application execution, data storage, network communication, and other computing services. During operation, demand or usage levels placed on the computing resources are typically variable. For example, user demand or usage levels can vary due to adoption of technologies, demographic or seasonal changes, or other reasons. Due to such demand variability, the shared computing resources may be exhausted during peak demand and resulting in service interruptions. To reduce risks of such service interruptions, cloud service providers typically forecast future demand or usage levels to direct provision of computing resources in advance to accommodate the forecasted demand.

Many techniques exist to predict or forecast future values such as demand or usage levels of computing services based on historical data. One example technique—time series analysis can include generating a set of historical data points of measurements in past demand or usage level of a computing service arranged along a time axis. Demand or usage levels of the computing service can be measured by, for instance, numbers of monthly active user (MAU), network bandwidth consumed by the computing device, computing load used by the computing service, or other suitable metrics. The historical data points can reflect changes in demand or usage levels of the computing service in response to various events. For instance, as an adoption rate of the computing service increases in a pool of users, observed demand or usage levels typically increase in some relation to the increase in the adoption rate as a function of time. Other example events can include increase in a pool of potential users, deployment of new features of the computing service, or other occurrences.

Upon obtaining the time series data, a forecasting technique can be used to extrapolate the time series data to predict or forecast future demand or usage levels of the computing service. For instance, exponential smoothing is an example forecast technique for predicting a future data point based on historical data points by smoothing time series data using an exponential window function that assigns exponentially decreasing weights over time. Exponential smoothing can be applied as a low-pass filter to remove high frequency noises in the time series data to generate a model representing best estimates of future time point data $\{s_t\}$. In one example, when a raw data sequence is represented by $\{x_t\}$ at time t=0, a simple form of exponential smoothing is given by the following formula:

$$s_0 = x_0$$

$$s_t = \alpha x_t + (1-\alpha) x_{t-1}, \ t>0$$

where $\alpha$ is a level smoothing factor ($0<\alpha<1$) that represents several historical data points used to forecast a level of a future time series value.

In certain applications, the exponential smoothing model $\{s_t\}$ can be optimized based on error measurements between values of actual historical time series data and those obtained from the exponential smoothing model. For instance, the smoothing factor $\alpha$ can be selected to minimize a sum of squared errors (SSE), a mean absolute percentage error (MAPE), a weighted mean absolute percentage error (WMAPE), or other suitable types of error measurements. In other examples, the exponential smoothing model can also be optimized using a slope smoothing factor $\beta$ ($0<\alpha<1$) that represents several historical data points used to forecast a slope of future time series data. The optimized exponential smoothing model can then be used to predict future demands based on events reflected in the historical data.

Though forecasting future values based on recorded historical data is valuable, such forecast technique may be deficient when predicting future values at least partially due to previously unseen events. Various previously unseen events can cause a sudden increase or decrease in demand or usage levels of a computing service (or other products or services). For example, the COVID pandemic of 2020 caused an abrupt increase in demand and usage levels of computing services for online meeting due to isolation requirements. Forecasting techniques based on historical data may not account for such abrupt increase or decrease because the historical data points do not reflect demand responses to such an event. As such, forecasted demand or usage levels based only on historical data can result in low resource provisioning for the computing services. As a result, capacity exhaustion of provisioned computing resources can occur and cause service interruptions.

Several embodiments of the disclosed technology can address certain aspects of the foregoing difficulties by implementing a forecast engine that accounts for previously unseen events by leveraging advance signals indicative of such unseen events. In certain implementations, the forecast engine can include a detection component, a classification component, an estimation component, and an integration component operatively coupled to one another to generate a prediction of future demand or usage levels of a computing service based on both historical data and any detected previously unseen events. In other implementations, the forecast engine can also include machine learning, input/output, network, or other suitable components. In further implementations, one or more of the foregoing components (e.g., the classification component or the integration component) may be omitted from the forecast engine. Corresponding functions of the omitted components can be performed by hardware/software components external to the forecast engine.

In certain embodiments, the detection component can be configured to detect previously unseen events based on one or more advance signals indicative of the future demand or usage level changes. The inventors have recognized that consumption of computing services typically involve three operational stages: service provision, service enablement, and active usage. Service provision can include creation of user accounts and assignment of subscription for the computing service. Service enablement can include a user or tenant activating the created user account and enable the user to use the computing service. At the active usage stage, the user can actively consume the computing service by, for example, transmitting and receiving packets to/from remote servers in datacenters or other suitable distributed computing systems.

The inventors have also recognized that a lead time may exist between successive stages of service provision, service enablement, and active usage. For example, a delay of thirty days has been observed when the number of enabled users is used as an advance signal of active usage of a computing service measured by MAU. In other words, after thirty days of observing a change in the number of enable users, the cloud service provider may observe a corresponding MAU change for active usage. In the following description, the number of enabled users is used as an example of an advance signal for active usages. In other embodiments, quantities of service provisions, quantities of service sales, or other related parameters can also be used as advance signals in addition to or in lieu of the number of enabled users.

The foregoing recognition allows configuration of the detection component to detect previously unsee event(s) by performing anomaly detection on time series data of an advance signal. For example, the detection component can be configured to transform historical data of the number of enabled users into a time series of period (e.g., daily, weekly, or monthly) deviation data. The detection component can be configured to then develop a machine learning model to isolate outliers in the time series data. Isolation forest is an example machine learning technique useful for detecting data point/observations that deviate significantly (e.g., based on a threshold) from other data points/observations. In other embodiments, the detection component can also apply machine learning models developed according to K-nearest neighbor, local outlier factor, K-means, support vector machine, local outlier probability, or other suitable anomaly detection algorithms. A machine learning engine can be configured to train an anomaly detection model for each group. This approach can be flexible on model deployment and detection performance adjustment because no trade-off on model performance from group to group by not using a single large-scale model. When new groups emerge, new models for the emerged groups can be developed instead of retraining a large-scale model with the entire dataset.

To detect anomaly during operation, in certain embodiments, the detection component can receive latest enabled user data from, for example, a tenant profile database. The detection component can then calculate an anomaly score (AS) using the trained machine learning model and the period deviation data of enabled users for each group. The detection component can then compare the calculated anomaly score with a score distribution of the training dataset to determine if an anomaly is detected, as shown in the equation below:

$$\Delta = |AS_{Daily} - AS_{train\_avg}|$$

Anomaly if $\Delta \geq n \times AS_{train\_std}$.

The threshold n can be determined by business insight or set based on other suitable criteria. In other embodiments, the detection component can be configured to calculate other suitable parameters based on the received enabled user data and the machine learning model.

Upon detecting an anomaly in the advance signal, the detection component can forward the detected one or more anomalies to the classification component to determine whether the detected one or more anomalies in the advance signal would result in anomalies of active usage, such as measured by MAU. In certain embodiments, the classification component can be configured to utilize a binary classification model trained using a machine learning engine according to Decision Tree, Random Forest, Logistic Regression, XGBoost, or other suitable machine learning algorithms utilizing features including numerical features (e.g., the number of enabled users, enabled user daily increase, MAU, MAU daily increase, MAU conversion ratio, month of the year, and day of the month, etc.) and categorical features (e.g., region, country, and customer group) found in the time series data as input. In other embodiments, the machine learning engine can also utilize other suitable features to train the machine learning model. Upon training the classification model, the classification component can be configured to output whether a detected anomaly in the advance signal would result in an anomaly in active usage based on one or more of the foregoing features related to the detected anomaly in the advance signal.

Upon completion, the classification component can indicate to the estimation component that one or more of the anomalies in the advance signal would result in anomalies in active usage. In turn, the estimation component can be configured to estimate a conversion rate from the detected anomaly in, e.g., the enabled user increase, in the advance signa into a change in active usage, e.g., MAU. In certain implementations, the conversion rate can be expressed as follows:

Conversion rate=MAU increase÷Anomaly in enabled users increase

To obtain the conversion rate, the estimation component can be configured to analyze usage patterns for users in different region and segment groups. For example, historical data of enabled user increases can be correlated to corresponding MAU increases to calculate the conversion rate according to the formula above. With the conversion rate, the estimation component can then be configured to calculate an expected MAU increase corresponding to the detected anomalies in the advance signal.

In certain embodiments, the estimation component can also be configured to determine a lead time between the detected anomaly in the advance signal and the increase in active usage. In one implementation, the estimation component can be configured to aggregate tenant level user data at for each region and by customer segments. The estimation component can also be configured to calculate a period change (e.g., daily, weekly, monthly, etc.) from the enabled users and MAU time series. To calculate the lead time between increases in enabled users and MAU, the estimation component can define T0 as a time point where the biggest enabled user anomaly is observed, and T1 as the time point where the biggest MAU anomaly is observed. The estimation component can then be configured to calculate the lead time as the time (e.g., days, weeks, etc.) between T0 and T1.

The integration component can be configured to combine estimation of increase in MAU based on time series analysis of MAU, referred to as organic growth $y_o(t)$ and the estimation of increase in active usage based on detected one or more anomalies of the advance signal $y_i(t)$, referred to as inorganic growth into an aggregate forecast y(t), as follows:

$$y(t) = y_o(t) + y_i(t) + \epsilon_t$$

In which $\epsilon_t$ is a user selected bias value. The organic growth can be estimated by performing a time series analysis, such as the exponential smoothing described above. For the inorganic growth $y_i(t)$, in certain embodiments, the integration component can be configured to forecast $y_i(t)$ using a line growth method as follows:

Estimate the lead time, l, between the anomaly in the number of enabled user time series and inorganic growth of MAU for a given country and segment combination;

Estimate the inorganic forecast cap, G, per the following formula:

G=Anomaly in enabled users increase×Conversion rate

Assume that the inorganic growth will grow uniformly between the days [l−d, l+d], where d≥0, the aggregation component can determine how long the inorganic growth would last; and Generate a linear trended forecast according to this formula, where $\hat{y}_i(t+h)$ represents the inorganic forecast generated at time t for a forecast horizon of h:

$$\hat{y}_i(t+h) = \begin{cases} 0, & \text{if } h < l-d \\ \frac{G}{2d+1} \cdot (h-l+d+1), & \text{if } h \in [l-d, l+d] \\ G, & \text{if } h > l+d \end{cases}$$

Thus, the aggregate forecast for MAU at horizon h would be $\hat{y}(t+h)=\hat{y}_o(t+h)+\hat{y}_i(t+h)$.

Several embodiments of the disclosed technology can thus more accurately estimate future demand or usage levels by accounting for both seen and unseen events. By monitoring certain advance signals, such as increases in enabled users, anomalies in the advance signals can be detected. The detected anomalies indicate probable inorganic growth in the active usage after certain delays. The impact of the detected anomalies in advance signals can be quantified by analyzing historical data to derive conversion rates. Thus, more accurate estimate of future demand or usage forecast can be generated by combining forecast based on organic growth and forecast based on inorganic growth. As a result, risks of capacity exhaustion and resulting service interruptions can be reduced.

DETAILED DESCRIPTION

Figure 1:
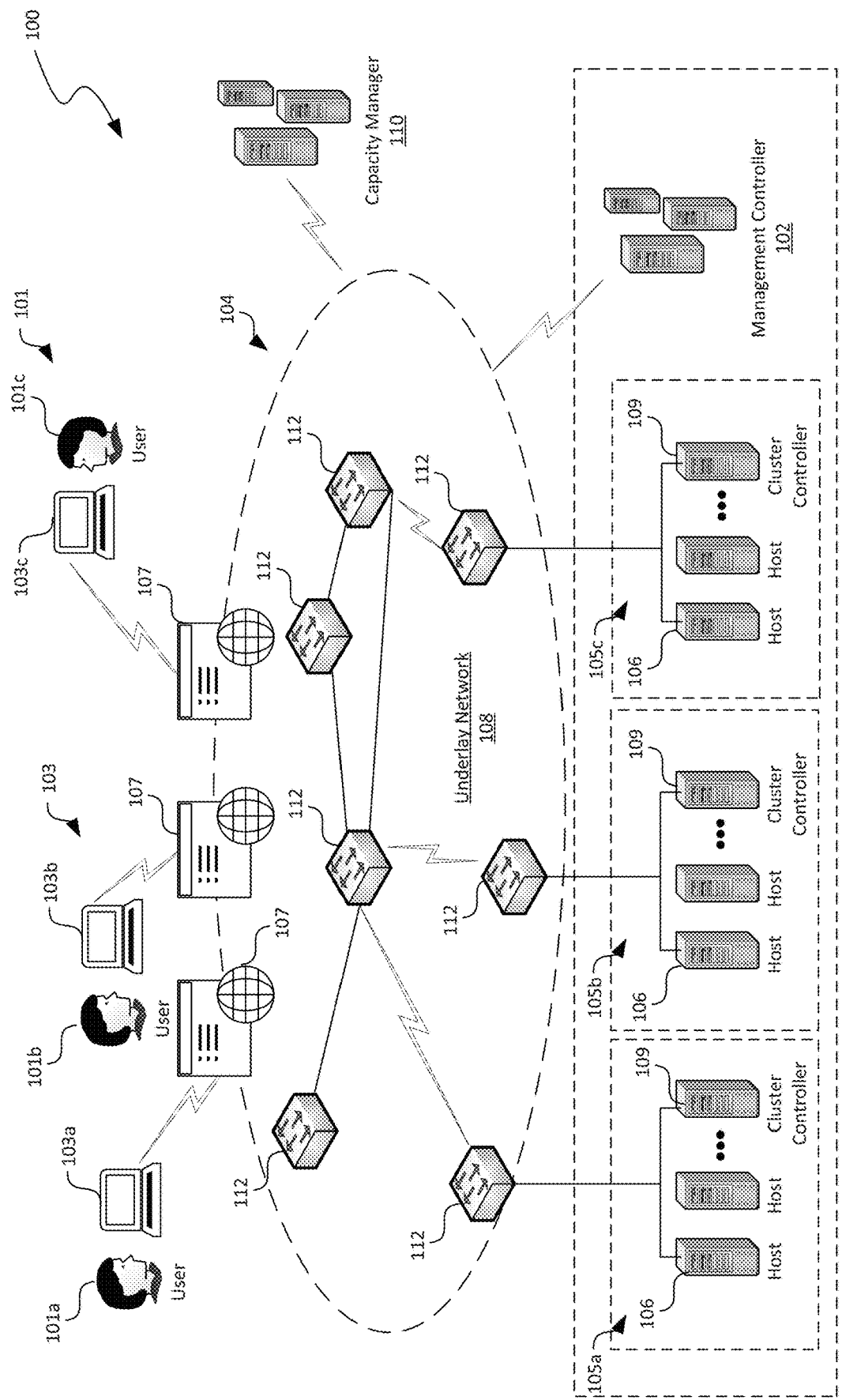
FIG. 1 is a schematic diagram of a distributed computing system implementing automated resource provisioning in accordance with embodiments of the disclosed technology.

Certain embodiments of computing systems, devices, components, modules, routines, and processes for resource provisioning forecast in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-9.

A computing cluster can include a computer system having a plurality of network devices that interconnect multiple servers or hosts to one another or to external networks (e.g., the Internet). One example of a computing cluster is one or more racks each holding multiple servers in a cloud computing datacenter (or portions thereof) configured to provide cloud services. One or more computing clusters can be interconnected to form a computing fabric. A network device can include a network communications component. Example network devices include routers, switches, hubs, bridges, load balancers, security gateways, or firewalls. A host can include a server or other suitable types of computing device configured to implement one or more virtual machines, virtual routers, virtual gateways, or other suitable virtualized computing components. For example, a host can include a server executing suitable instructions to provide a hypervisor configured to support one or more virtual machines for one or more users or tenants on the same server.

Cloud services or computing services can include computing resources provided to users over a computer network such as the Internet. Common examples of cloud services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

A computing resource can include a physical or virtual component of a limited availability within a computing system. In one example, computing resources can include servers, processor cores, or other hardware computing devices or internal components thereof. In another example, computing devices can also host and provide virtual machines, containers, cloud storage spaces, communications bandwidths, or other suitable virtual computing resources. Also, resource capacity is an amount of a computing resource of certain resource types in a cluster, datacenter, or region that is available to be consumed by users. One example capacity of computing resources can include numbers of processors, cores, or virtual machines of certain sizes that can be deployed in a region.

Time series data is a set of data having multiple data points arranged or indexed according to corresponding time points or otherwise with respect to time. Examples of time series can include heights of ocean tides, counts of sunspots, and network bandwidth consumed over a day, week, or month. Various techniques can be used to derive time series models based on time series data of historical values to predict future values. For example, curve fitting can be used to construct a curve or a mathematic function/model that best fit to a series of data points in time series data. During such curve fitting, a smoothing function, e.g., exponential smoothing, can be applied to fit the curve to the time series data. As used herein, "exponential smoothing" generally refers to a technique for smoothing time series data using an exponential window function. In one example, when a raw data sequence is represented by $\{x_t\}$ at time t=0, a simple form of exponential smoothing is given by the following formula:

$$s_o = x_o$$

$$s_t = \alpha x_t + (1-\alpha) x_{t-1}, \; t > 0$$

where $\alpha$ is a level smoothing factor ($0 < \alpha < 1$) that represents a number of historical data points used to forecast a level of a future time series value. In another example, an exponential smoothing is given by the following formula:

$$s_1 = x_1$$

$$b_1 = x_1 - x_0$$

for $t > 1$:

$$s_t = \alpha x_t + (1-\alpha)(s_{t-1} + b_{t-1})$$

$$b_t = \beta(s_t - s_{t-1}) + (1-\beta) b_{t-1}$$

where $\alpha$ is the level smoothing factor ($0 < \alpha < 1$), and $\beta$ is the slope or trend smoothing factor ($0 < \beta < 1$).

The exponential smoothing model $\{s_t\}$ can be optimized based on error measurements between values of actual historical time series data and those obtained from the exponential smoothing model. For instance, the smoothing factor $\alpha$ may be selected to minimize a sum of squared errors (SSE), a mean absolute percentage error (MAPE), a weighted mean absolute percentage error (WMAPE), or other suitable types of error measurements. In other examples, the exponential smoothing model can also be optimized using a slope smoothing factor $\beta$ ($0 < \alpha < 1$) that represents numbers of historical data points used to forecast a slope of future time series data.

Though forecasting future values based on recorded historical data is valuable, such forecast technique may be deficient when predicting future values at least partially due to previously unseen events. Forecasting techniques based on historical data may not account for such previously unseen events because the historical data points do not reflect responses to such an event. As such, forecasted demand or usage levels based only on historical data can result in low resource provisioning for the computing services. As a result, capacity exhaustion of provisioned computing resources can occur and cause service interruptions.

Several embodiments of the disclosed technology can address certain aspects of the foregoing difficulties by implementing a forecast engine that accounts for previously unseen events by leveraging advance signals indicative of such unseen events. By monitoring certain advance signals, such as increases in enabled users, anomalies in the advance signals can be detected. The detected anomalies indicate probable inorganic growth in the active usage after certain delays. The impact of the detected anomalies in advance signals can be quantified by analyzing historical data to derive conversion rates. Thus, more accurate estimate of future demand or usage forecast can be generated by combining forecast based on organic growth and forecast based on inorganic growth. As a result, risks of capacity exhaustion and resulting service interruptions can be reduced, as described in more detail below with reference to FIGS. 1-9.

FIG. 1 is a schematic diagram illustrating a distributed computing system 100 implementing resource provisioning forecast in accordance with embodiments of the disclosed technology. As shown in FIG. 1, the distributed computing system 100 can include an underlay network 108 interconnecting a plurality of client devices 103 (shown as first, second, and third client devices 103a-103c, respectively) of corresponding users 101 (shown as first, second, and third user 101a-101c, respectively), a computing fabric 104, and a capacity manager 110. Even though particular components are shown in FIG. 1, in other embodiments, the distributed computing system 100 can also include additional and/or different constituents. For example, the distributed computing system 100 can include network storage devices, utility infrastructures, and/or other suitable components in addition to or in lieu of those shown in FIG. 1.

The client devices 103 can each include a computing device that facilitates corresponding users 101 to access cloud services provided by the hosts 106 via the underlay network 108. For example, in the illustrated embodiment, the client devices 103 individually include a desktop computer. In other embodiments, the client devices 103 can also include laptop computers, tablet computers, smartphones, or other suitable computing devices. Even though two users 101 are shown in FIG. 1 for illustration purposes, in other embodiments, the distributed computing system 100 can facilitate any suitable number of users 101 to access suitable types of cloud computing services provided by the hosts 106.

As shown in FIG. 1, the underlay network 108 can include one or more physical network devices 112 that interconnect the client devices 103, the computing fabric 104, and the capacity manager 110. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, mesh, or other suitable topologies.

The computing fabric 104 can include a management controller 102 and a plurality of hosts 106 operatively coupled to one another by the network devices 112. In certain embodiments, the hosts 106 can individually include a physical server or a computing blade having multiple physical servers. In other embodiments, the hosts 106 can also include one or more physical servers with multiple processor cores, or other suitable types of computing devices.

The hosts 106 can be organized into racks, availability zones, groups, sets, computing clusters, or other suitable divisions. For example, in the illustrated embodiment, the hosts 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Each cluster 105 can also include a cluster controller 109 configured to monitor status and manage operations of the hosts 106 in the corresponding computing cluster 105. For example, the cluster controller 109 can monitor whether a host 106 or components thereof has failed. In response to detecting a failure of the host 106 or components thereof, the cluster controller 109 can attempt to remedy the detected failure by, for instance, migrating virtual machines hosted on the failed host 106 to other hosts 106 in the same cluster 105, restarting the failed host 106, replacing hardware components of the failed host 106, and/or perform other suitable operations. Though the cluster controllers 109 are shown as separate physical servers in FIG. 1, in other embodiments, the cluster controllers 109 can also include computing services provided by one or more of the hosts 106 in corresponding computing clusters 105.

The management controller 102 can be configured to monitor, control, or otherwise manage operations of the computing clusters 105. For example, in certain embodiments, the management controller 102 can include a fabric controller configured to manage compute, storage, communications, or other types of resources in the computing clusters 105 for hosting computing services. In other embodiments, the management controller 102 can also include a datacenter controller, application delivery controller, or other suitable types of controllers. In the illustrated embodiment, the management controller 102 is shown as being separate from the computing clusters 105. In other embodiments, the management controller 102 can include one or more hosts 106 in the computing clusters 105. In further embodiments, the management controller 102 can include software services hosted on one or more of the hosts 106 in the computing clusters 105.

The capacity manager 110 can be configured to predict future demand or usage levels of various computing resources in the distributed computing system 100. For example, the capacity manager 110 can receive historical and/or current usage data in the distributed computing system 100 and predict based thereon, future demand or usage levels for the various computing resources. Based on the predicted future demand or usage levels, the capacity manager 110 can determine types and quantity of computing resources to be provisioned in the distributed computing system 100. The capacity manager 110 can also be configured to trigger various machine actions for accommodating the predicted future usage levels. Example remedial actions can include prioritizing out-for-repair hosts 106 that are designed to provide the type of computing resources over other types of computing resources or other suitable actions.

Even though the capacity manager 110 is shown in FIG. 1 as a separate component from the management controller 102 and the hosts 106 of the distributed computing system 100, in other embodiments, certain functionalities of the capacity manager 110 can a part of the management controller 102 or one or more of the cluster controllers 109. In further embodiments, other functionalities of the capacity manager 110 can also be provided as one or more computing services hosted on one or more of the hosts 106 in the computing fabric 104. Certain example components of the capacity manager 110 and details of operations are described in more detail below with reference to FIGS. 3-7.

In operation, the users 101 can request various computing services (e.g., online meeting) or computing resources (e.g., network bandwidth) via, for example, user portals 107 on corresponding client devices 103. In response, the management controller 102 can allocate one or more hosts 106 or other computing resources to execute suitable instructions to provide the requested computing services. Once allocated, the computing resources may be unavailable to other users 101 until the requested computing services have been terminated. As such, available capacity of various computing resources can fluctuate in the distributed computing system 100. In certain situations, such as a sudden surge of user demand due to a previously unseen event, the computing resources may be exhausted such that some requests from the users 101 would fail, and thus result in service interruptions. Such failures can negatively impact user experience of the computing services.

Several embodiments of the distributed computing system 100 can forecast and proactively provision for future demand on various computing resources in the distributed computing system 100 based on historical usage levels and any detected previously unseen events. For example, the capacity manager 110 can predict a usage level for virtual machines 144 (shown in FIG. 2) for executing online meeting applications and proactively provision for and deploying additional virtual machines 144 on the host 106 to accommodate the predicted future usage levels. In another example, the capacity manager 110 can also trigger expedited build-out of additional hosts 106 in the computing clusters 105. As such, service interruptions to the users 101 due to capacity exhaustion can be reduced when compared to reactive remedial techniques, as described in more detail below with reference to FIGS. 3-7.

Figure 2:
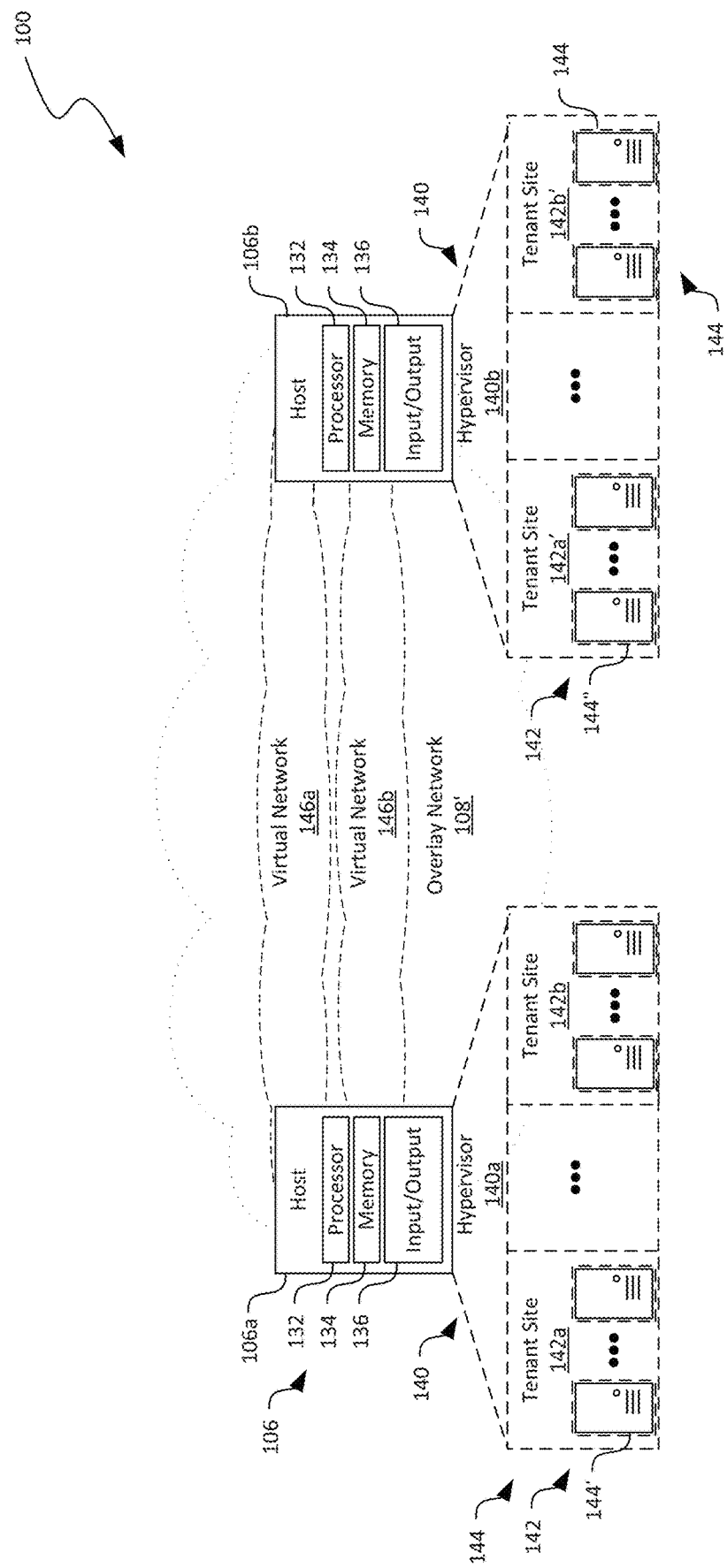
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 of FIG. 1 in accordance with embodiments of the disclosed technology. In FIG. 2, only certain components of the distributed computing system 100 of FIG. 1 are shown for clarity. As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 8A and 8B). The input/output component 136 can include a network interface card or other suitable types of input/output devices configured to accept input from and provide output to an operator and/or an automated software controller (not shown).

The memory 134 of the first and second hosts 106a and 106b can include instructions executable by the corresponding processors 132 to cause the individual hosts 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 106a can provide a first hypervisor 140a that manages first and second tenant sites 142a and 142b, respectively, for the same or different tenants or users 101 (FIG. 1). The second host 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 106a and the second host 106b can both host the tenant site 142a and 142a' for a first user 101a. The first host 106a and the second host 106b can both host the tenant site 142b and 142b' for a second user 101b (FIG. 1). Each virtual machine 144 can be executing a corresponding operating system, middleware, and/or applications.

Also shown in FIG. 2, the distributed computing system 100 can include one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a virtual network 146. Thus, different virtual networks 146 can use one or more virtual network addresses that are the same. Example virtual network addresses can include IP addresses, MAC addresses, and/or other suitable addresses.

Figure 3:
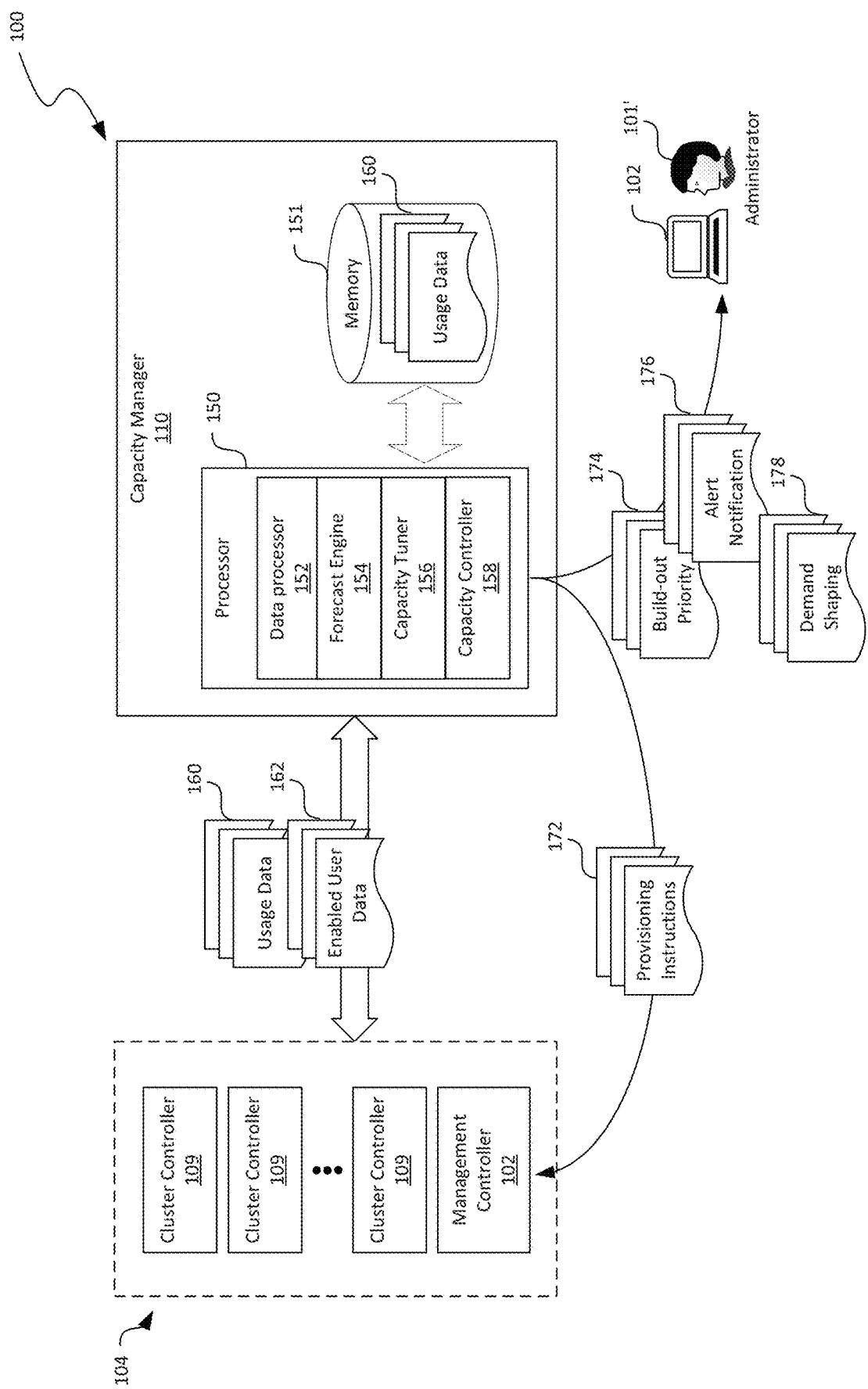
FIG. 3 is a schematic diagram illustrating certain hardware/software components of a capacity manager in the distributed computing system in accordance with embodiments of the disclosed technology.

FIG. 3 is a schematic diagram illustrating certain hardware/software components of a capacity manager 110 in the distributed computing system 100 of FIG. 1 in accordance with embodiments of the disclosed technology. In FIG. 3, certain hardware/software components of the distributed computing system 100 are omitted for clarity. For example, only the management controller 102 and the cluster controllers 109 are shown in FIG. 3 as the computing fabric 104 for illustration purposes. The hosts 106 are not shown in FIG. 3.

In addition, in FIG. 3 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the capacity manager 110 can include a processor 150 and a memory 151 operatively coupled to one another. The processor 150 can include a microprocessor, a field-programmable gate array, and/or other suitable logic devices. The memory 151 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 150. In the illustrated embodiment, the processor 150 can be configured to execute instructions from, for instance, the memory 151 to provide a data processor 152, a forecast engine 154, a capacity tuner 156, and a capacity controller 158 operatively coupled to one another. In other embodiments, the processor 150 can also execute suitable instructions to provide an interface component, a network component, or other suitable types of components (not shown).

The data processor 152 can be configured to receive and process various data from different components of the computing fabric 104. For example, as shown in FIG. 3, the data processor 152 can receive data representing historical and current usage levels (shown as "usage data" 160) of certain computing resources (e.g., as measured by MAU), and data representing numbers of enabled users (shown as "enabled user data" 162) from the cluster controllers 109 and/or the management controller 102. In other embodiments, the data processor 152 can also receive data representing information about numbers of provisioned users, out-for-repair hosts 106 (FIG. 1), capacity reservations, upcoming new cluster 105 (FIG. 1), or other suitable types of data from the hosts 106 or other suitable components of the computing fabric 104.

In certain embodiments, the data processor 152 can be configured to query the cluster controllers 109, the fabric controller 102, or other suitable components of the distributed computing system 100 for the various types of data. In other embodiments, the data processor 152 can attempt to instantiate an instance of a resource type (e.g., a virtual machine 144) and determine how many instances may have been provided in the shared pool. In further embodiments, the data processor 152 can determine the currently used and/or available resources in other suitable manners. The data processor 152 can also store the received data from the computing fabric 104 in the memory 151 or other suitable storage locations. Though only the usage data 160 are shown as being stored in the memory 151, any other types of received data can be similarly stored in addition to or in lieu of the usage data 160.

The data processor 152 can also be configured to sort, filter, interpolate, extrapolate, or perform other suitable data operations on the received data from the computing fabric 104. The received data from the computing fabric 104 can have large variances or even missing data points. For example, the usage data 160 of MAU can fluctuate in the computing fabric 104 as a function of time or other parameters. As such, the usage data 160 may indicate high usage levels during certain time periods and virtually no usage during other time periods. To address such large variances, the data processor 152 can be configured to aggregate the received usage data 160 to obtain a suitable data set for analysis by the forecast engine 154.

The forecast engine 154 is configured to receive the processed data set of the usage data 160 and enabled user data 162 from the data processor 152 and generate a future demand or usage level for a computing service based on the received data set. In certain embodiments, the forecast engine 154 can be configured to determine a correlation between the usage level and time using curve fitting, function approximation, autoregressive integrated moving average, or other suitable techniques. In one example, the forecast engine 154 can be configured to apply exponential smoothing during curve fitting of the received data set of the user data 160 to generate a time series model for the usage data 160. Based on the generated time series model of the user data 160, the forecast engine 154 can then extrapolate future usage levels for the computing service for future time points. In other embodiments, the forecast engine 154 can also be configured to forecast a demand or usage level of the computing service using an advance signal such as the enabled user data to account for previously unseen events. Thus, by combining the future usage levels predicted based on the usage data 160 and the enabled user data 162, the forecast engine 154 can more accurately predict an aggregated future demand or usage levels of the computing service. Example components of the forecast engine 154 are described below in more detail with reference to FIG. 4.

As shown in FIG. 3, the capacity manager 110 can also include a capacity tuner 156 configured to adjust the predicted future usage levels from the forecast engine 154 based on, for example, service restrictions, operation failures, and/or other suitable conditions impacting computing resources in the computing fabric 104. For example, the service restrictions can contain data representing an offer restriction of, for instance, virtual machines 144 of a certain size. As such, a corresponding usage level for the type of virtual machines is artificially decreased by disallowing users 101 to deploy resources of such a resource type. Thus, the predicted future usage level based on artificially decreased historical usage levels may not reflect actual demand for such resources. To account for the offer restriction, the capacity tuner 156 can be configured to increase, decrease, or otherwise adjusted the predicted future usage levels from the forecast engine 154 based on, for instance, another usage level in a similar computing fabric (not shown) that does not have such offer restriction imposed. In other embodiments, the capacity tuner 156 can also be configured to adjust the predicted future usage levels by applying factors, offsets, or other suitable adjustments based on usage quota approval, indication of previous allocation failures or other suitable operating conditions. In further embodiments, the capacity tuner 156 may be omitted.

Based on the predicted future usage levels from the forecast engine 154 and/or the capacity tuner 156, the capacity controller 158 can be configured to determine whether additional computing resources may be allocated and provisioned to accommodate the future usage levels. For example, the capacity controller 158 can be configured to determine whether a capacity shortage of the type of computing resources is likely to occur in the computing fabric 104 based on the predicted future usage levels. In certain embodiments, the capacity controller 158 can be configured to determine current and/or future inventory levels of computing resources in terms of, for instance, numbers of days/weeks/months after which the currently available resources would be exhausted at a current or future time points. The capacity controller 158 can then compare the determined inventory level to the predicted future usage levels to determine whether a capacity shortage would likely occur soon. For example, if a virtual machine of a certain size has an inventory level (e.g., seven days) that is less than a corresponding predicted future usage level (e.g., ten days), the capacity controller 158 can indicate that a capacity shortage of virtual machine of that size would likely occur at a future time point corresponding to the future usage level.

Upon indicating that a capacity shortage is likely to occur at the future time point, the capacity controller 158 can be configured to trigger various remedial actions. For example, as shown in FIG. 3, the capacity controller 158 can be configured to generate an alert notification 176 (e.g., via email) to an administrator 101'. The capacity controller 158 can also be configured to generate a signal of build-out priority 174 that expedites installation of hosts 106 (FIG. 1) or other suitable components of the distributed computing system 100 that are designed to provide the type of computing resources.

In certain embodiments, the capacity controller 158 can further be configured to generate another signal of recovery ranking for out-for-repair hosts 106 and/or provisioning instructions 173 to be transmitted to, for instance, the management controller 102. In turn, the management controller 102 and/or the cluster controllers 109 can prioritize repair of out-for-repair hosts 106 designed to provide the type of computing resources and/or allocate and provision additional computing resources to accommodate the predicted future usage levels. Thus, capacity of the type of computing resources likely to experience capacity shortage may be increased to avoid exhaustion of the computing resources at the future time point. In other embodiments, the capacity manager 110 can be configured to perform the foregoing recovery, allocation, and/or provisioning operations directly instead of the management controller 102.

In further embodiments, the capacity controller 158 can be configured to generate a signal representing demand shaping 178. For example, if the computing fabric 104 cannot be expanded due to space or other constraints, the capacity controller 158 can be configured to generate offer restrictions that prevent the users 101 from requesting the type of computing resources likely to experience capacity shortage. In yet further embodiments, the capacity controller 158 can be configured to perform a rebalance of load distributions between, for example, an on-premises cloud computing system and a public cloud computing system by shifting compute loads therebetween.

Several embodiments of the disclosed technology can thus improve reliability of cloud services provided by the computing fabric 104. By continuously monitoring for potential inventory shortages of various types of computing resources based on predicted future usage levels, a risk of unexpectedly exhausting computing resources in the distributed computing systems 100 can be reduced. In addition, by detecting advance signals of active usage change, the capacity manager 110 can provision computing resources for both events previously seen and events that are previously unseen. Thus, instead of being unable to accommodate a suddenly high demand or usage levels, computing resources can be suitably provisioned in the distributed computing system 100 to at least reduce a risk of capacity exhaustion. As such, user experience with the provided cloud services may be enhanced.

Figure 4:
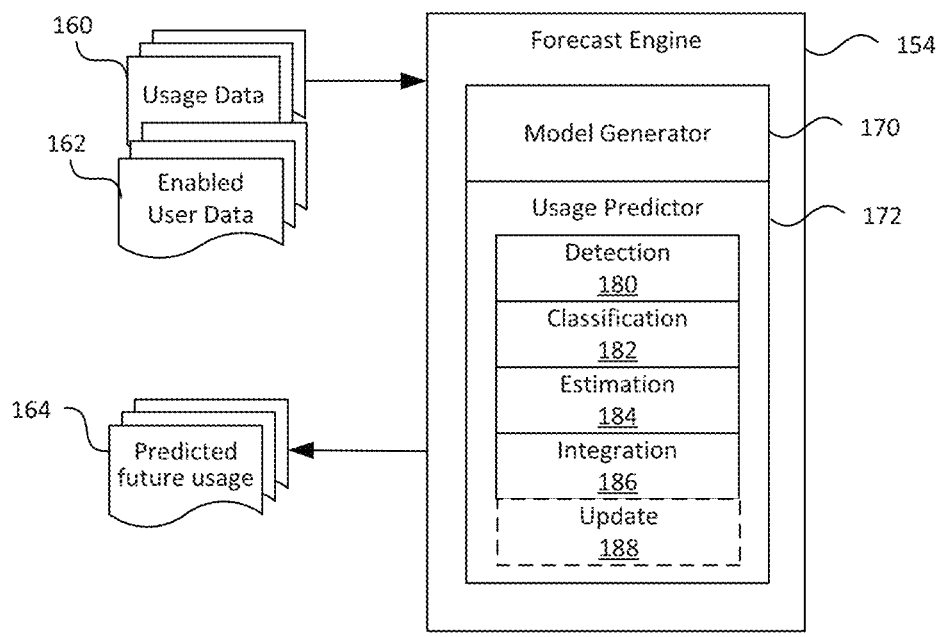
FIG. 4 is a schematic diagram illustrating a forecast engine suitable for the capacity manager in FIG. 3 in accordance with embodiments of the disclosed technology.

FIG. 4 is a schematic diagram illustrating a forecast engine 154 suitable for the capacity manager 110 in FIG. 3 in accordance with embodiments of the disclosed technology. As shown in FIG. 4, the forecast engine 154 can include a model generator 170 and a usage predictor 172 operatively coupled to one another. The model generator 170 can be configured to generate a time series or other suitable types of models of the usage data 160 (FIG. 3) and the enabled user data 162. For example, based on the usage data 160, the model generator 170 can be configured to generate a set of historical data points of measurements in past demand or usage level of a computing service arranged along a time axis. Demand or usage levels of the computing service can be measured by, for instance, MAU, network bandwidth consumed by the computing device, computing load used by the computing service, or other suitable metrics. The historical data points can reflect changes in demand or usage levels of the computing service in response to various events. For instance, as an adoption rate of the computing service increases in a pool of users, observed demand or usage levels typically increase in some relation to the increase in the adoption rate as a function of time. Other example events can include increase in a pool of potential users, deployment of new features of the computing service, or other occurrences.

Upon obtaining the time series data, the model developer 170 can be configured to apply a forecasting technique to extrapolate the time series data to predict or forecast future demand or usage levels of the computing service based on historical data. For instance, exponential smoothing is an example forecast technique for predicting a future data point based on historical data points by smoothing time series data using an exponential window function that assigns exponentially decreasing weights over time. Exponential smoothing can be applied as a low-pass filter to remove high frequency noises in the time series data to generate a model representing best estimates of future time point data $\{s_t\}$. In one example, when a raw data sequence is represented by $\{x_t\}$ at time t=0, a simple form of exponential smoothing is given by the following formula:

$$s_0 = x_0$$

$$s_t = \alpha x_t + (1-\alpha)x_{t-1}, \ t > 0$$

where $\alpha$ is a level smoothing factor ($0<\alpha<1$) that represents several historical data points used to forecast a level of a future time series value.

In certain applications, the exponential smoothing model $\{s_t\}$ can be optimized based on error measurements between values of actual historical time series data and those obtained from the exponential smoothing model. For instance, the smoothing factor $\alpha$ can be selected to minimize a sum of squared errors (SSE), a mean absolute percentage error (MAPE), a weighted mean absolute percentage error (WMAPE), or other suitable types of error measurements. In other examples, the exponential smoothing model can also be optimized using a slope smoothing factor $\beta$ ($0<\alpha<1$) that represents several historical data points used to forecast a slope of future time series data. The optimized exponential smoothing model can then be used to predict future demands based on events reflected in the historical data.

Though forecasting future values based on recorded historical data is valuable, such forecast technique may be deficient when predicting future values at least partially due to previously unseen events. Various previously unseen events can cause a sudden increase or decrease in demand or usage levels of a computing service (or other products or services). For example, the COVID pandemic of 2020 caused an abrupt increase in demand and usage levels of computing services for online meeting due to isolation requirements. Forecasting techniques based on historical data may not account for such abrupt increase or decrease because the historical data points do not reflect demand responses to such an event. As such, forecasted demand or usage levels based only on historical data (e.g., user data 160) can result in low resource provisioning for the computing services. As a result, capacity exhaustion of provisioned computing resources can occur and cause service interruptions.

In accordance with embodiments of the disclosed technology, the usage predictor 172 can be configured to forecast future demand or usage levels that account for previously unseen events by leveraging advance signals indicative of such unseen events. As shown in FIG. 4, in the illustrated embodiment, the usage predictor 172 includes a detection component 180, a classification component 182, an estimation component 184, and an integration component 186 operatively coupled to one another to generate a prediction of future demand or usage levels of a computing service based on both historical data and any detected previously unseen events. In other implementations, the usage predictor 172 can also include machine learning, input/output, network, or other suitable components. In further implementations, one or more of the foregoing components (e.g., the classification component 182 or the integration component 186) may be omitted from the usage predictor 172. Corresponding functions of the omitted components can be performed by hardware/software components external to the usage predictor 172.

In certain embodiments, the detection component 180 can be configured to detect previously unseen events based on one or more advance signals indicative of the future demand or usage level changes. The inventors have recognized that consumption of computing services typically involve three operational stages: service provision, service enablement, and active usage. Service provision can include creation of user accounts and assignment of subscription for the computing service. Service enablement can include a user or tenant activating the created user account and enable the user 101 (FIG. 1) to use the computing service. At the active usage stage, the user 101 can actively consume the computing service by, for example, transmitting and receiving packets to/from the distributed computing system 100 (FIG. 1).

Figure 5:
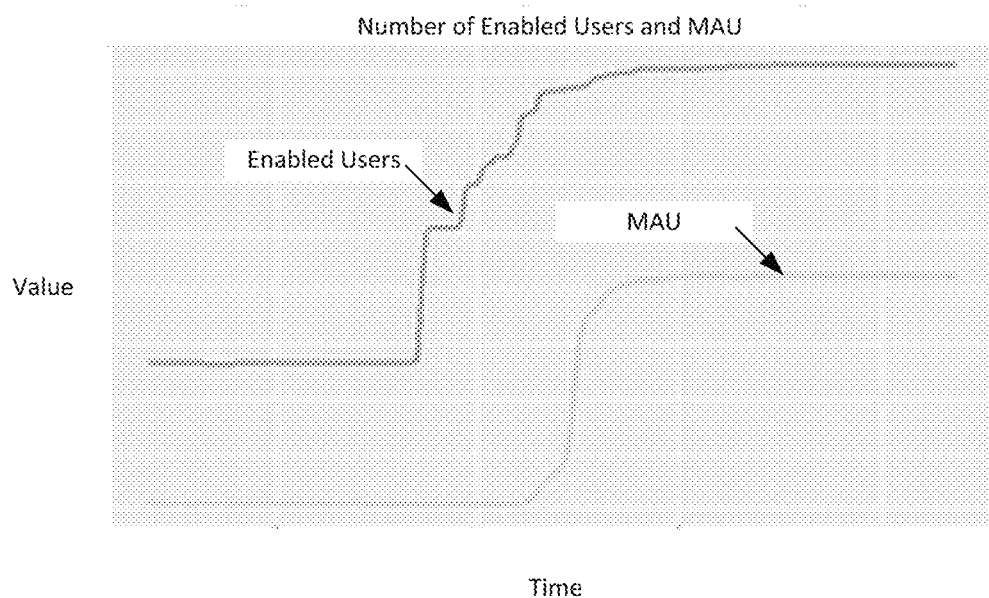
FIG. 5 is an example graph illustrating an advance signal and active usage variations with respect to time in accordance with embodiments of the disclosed technology.

The inventors have also recognized that a lead time may exist between successive stages of service provision, service enablement, and active usage. For example, as shown in FIG. 5, a delay of thirty days has been observed when the number of enabled users is used as an advance signal of active usage of a computing service measured by MAU. In other words, after thirty days of observing a change in the number of enable users, a cloud service provider may observe a corresponding MAU change for active usage. In the description herein, the number of enabled users is used as an example of an advance signal for active usage. In other embodiments, quantities of service provisions, quantities of service sales, or other related parameters can also be used as advance signals in addition to or in lieu of the number of enabled users.

Figure 6A:
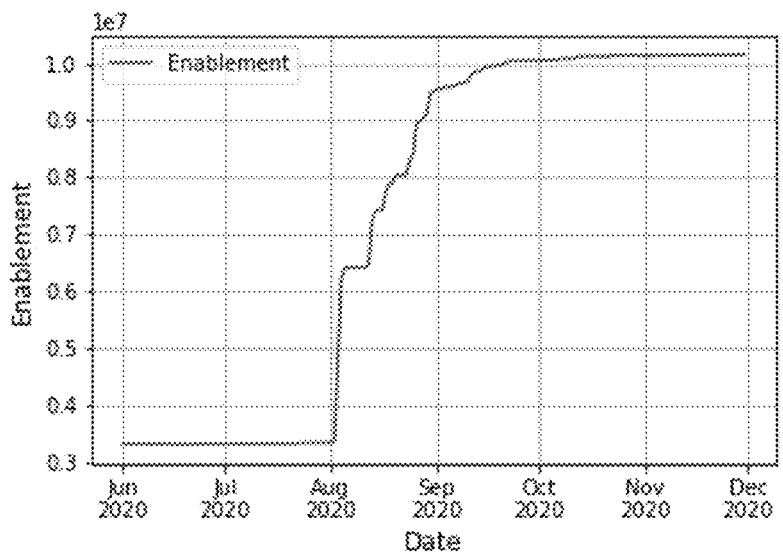
FIGS. 6A-6C are example enabled user quantity, daily enabled user change, and anomaly in the daily enabled user change in accordance with embodiments of the disclosed technology.
Figure 6B:
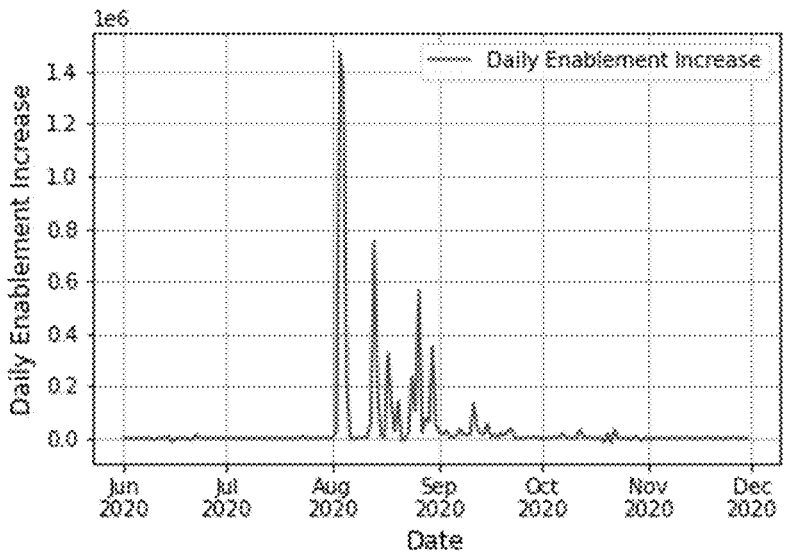

Returning to FIG. 4, the foregoing recognition allows configuration of the detection component 180 to detect previously unsee event(s) by performing anomaly detection on time series data of an advance signal. For example, the detection component 180 can be configured to transform historical data of the number of enabled users, as shown in FIG. 6A, into a time series of, for example, daily deviation data, as shown in FIG. 6B. As shown in FIG. 6A, enabled users numbers stayed generally flat from June 2020 to August 2020. Subsequently, the enabled user numbers surged from August 2020 until plateaued after about October 2020. As shown in FIG. 6B, daily enablement increases show large peaks between August 2020 and September 2020. After the sudden surge, user enablement generally stabilized.

Figure 6C:
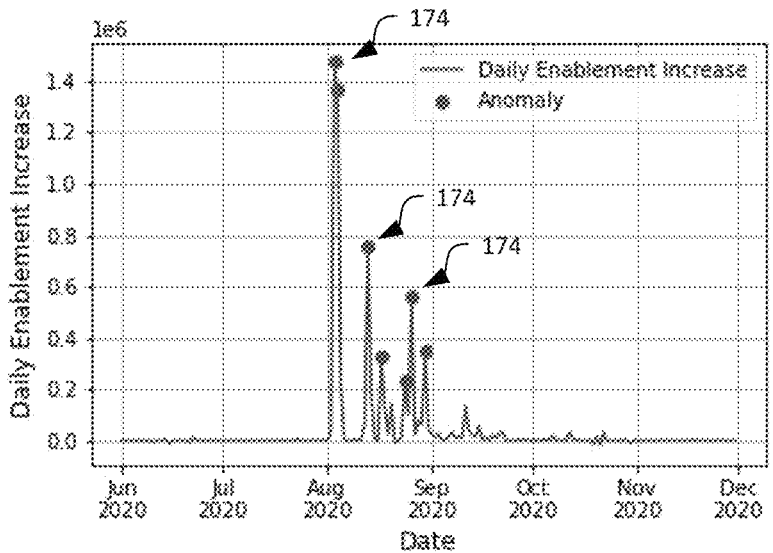

Returning to FIG. 4, the detection component 180 can be configured to then apply a machine learning model to isolate outliers in the time series data as shown in FIG. 6B. Isolation forest is an example machine learning technique useful for detecting data point/observations that deviate significantly (e.g., based on a threshold) from other data points/observations. In other embodiments, the detection component 180 can also apply machine learning models developed according to K-nearest neighbor, local outlier factor, K-means, support vector machine, local outlier probability, or other suitable anomaly detection algorithms. As shown in FIG. 6C, by applying an anomaly detection, the detection component 180 can identify outliers or anomalies 174 of the daily enablement increases.

Returning to FIG. 4, a machine learning engine (not shown) can be configured to train an anomaly detection model for each group. This approach can be flexible on model deployment and detection performance adjustment because no trade-off on model performance from group to group by not using a single large-scale model. When new groups emerge, new models for the emerged groups can be developed instead of retraining a large-scale model with the entire dataset. In certain embodiments, the machine learning engine can be a part of the model generator 170 or the usage predictor 172. In other embodiments, the machine leaning engine can be a component external to the forecast engine 154.

To detect anomaly during operation, in certain embodiments, the detection component 180 can receive latest enabled user data 162 (FIG. 3) from, for example, a tenant profile database at the cluster controller 109, the management controller 102, or other suitable locations. The detection component 180 can then calculate an anomaly score (AS) using the trained machine learning model and the period deviation data of enabled users for each group. The detection component 180 can then compare the calculated anomaly score with a score distribution of the training dataset to determine if an anomaly is detected, as shown in the equation below:

$$\Delta = |AS_{Daily} - AS_{train\_avg}|$$

Anomaly if $\Delta \geq n \times AS_{train\_std}$.

The threshold n can be determined by business insight or set based on other suitable criteria. In other embodiments, the detection component 180 can be configured to calculate other suitable parameters based on the received enabled user data and the machine learning model.

Upon detecting an anomaly 174 (FIG. 6) in the advance signal, the detection component 180 can forward the detected one or more anomalies 174 to the classification component 182 to determine whether the detected one or more anomalies 174 in the advance signal would result in anomalies of active usage, such as measured by MAU. In certain embodiments, the classification component 182 can be configured to utilize a binary classification model trained using a machine learning engine (not shown) according to Decision Tree, Random Forest, Logistic Regression, XGBoost, or other suitable machine learning algorithms utilizing features including numerical features (e.g., the number of enabled users, enabled user daily increase, MAU, MAU daily increase, MAU conversion ratio, month of the year, and day of the month, etc.) and categorical features (e.g., region, country, and customer group) found in the time series data as input. In other embodiments, the machine learning engine can also utilize other suitable features to train the machine learning model. Upon training the classification model, the classification component 182 can be configured to output whether a detected anomaly 174 in the advance signal would result in an anomaly in active usage based on one or more of the foregoing features related to the detected anomaly in the advance signal.

Upon completion, the classification component 182 can indicate to the estimation component 184 that one or more of the anomalies 174 in the advance signal would result in anomalies in active usage. In turn, the estimation component 184 can be configured to estimate a conversion rate from the detected anomaly 174 in, e.g., the enabled user data 162 (FIG. 3), in the advance signa into a change in active usage, e.g., MAU included in the usage data 160 (FIG. 3). In certain implementations, the conversion rate can be expressed as follows:

Conversion rate=MAU increase÷Anomaly in enabled users increase

To obtain the conversion rate, the estimation component 184 can be configured to analyze usage patterns for users 101 in different region and segment groups. For example, historical data of enabled user increases can be correlated to corresponding MAU increases to calculate the conversion rate according to the formula above. With the conversion rate, the estimation component 184 can then be configured to calculate an expected MAU increase corresponding to the detected anomalies in the advance signal.

Figure 7:
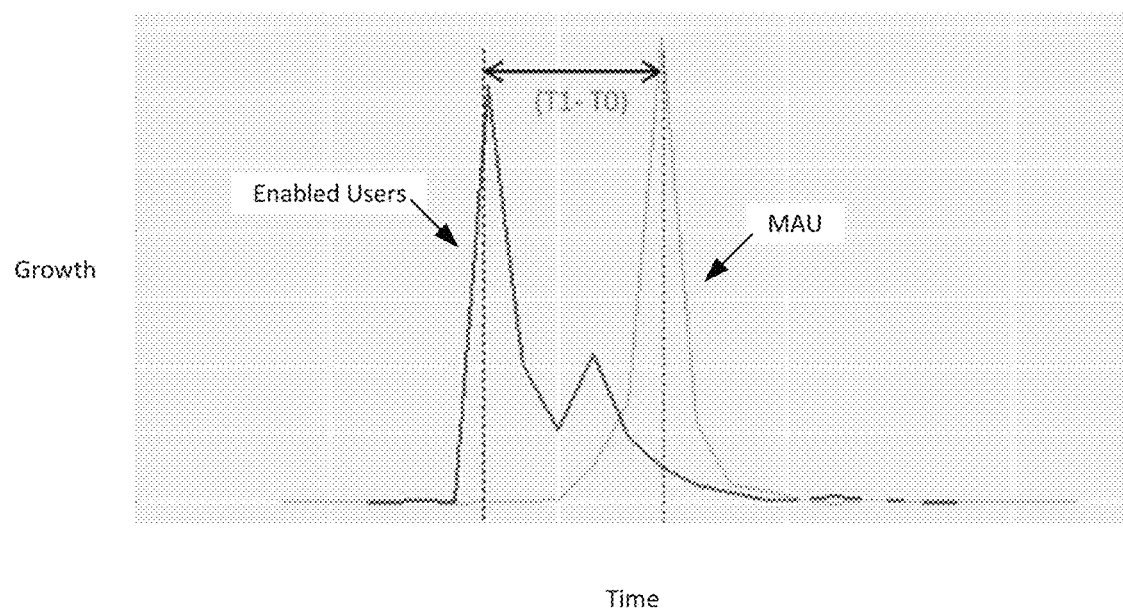
FIG. 7 is an example plot illustrating determination of lead time between changes in enabled users and active usage in accordance with embodiments of the disclosed technology.

In certain embodiments, the estimation component 184 can also be configured to determine a lead time between the detected anomaly 174 in the advance signal and the increase in active usage of the computing service. In one implementation, the estimation component 184 can be configured to aggregate tenant level user data at for each region and by customer segments. The estimation component 184 can also be configured to calculate a period change (e.g., daily, weekly, monthly, etc.) from the enabled users and MAU time series. To calculate the lead time between increases in enabled users and MAU, the estimation component 184 can define T0 as a time point where the biggest enabled user anomaly is observed, and T1 as the time point where the biggest MAU anomaly is observed. The estimation component 184 can then be configured to calculate the lead time as the time (e.g., days, weeks, etc.) between T0 and T1, as shown in FIG. 7.

Returning to FIG. 4, the integration component 186 can be configured to combine estimation of increase in MAU based on time series analysis of the usage data 160, referred to as organic growth $y_o(t)$ and the estimation of increase based on detected one or more anomalies 174 of the advance signal $y_i(t)$, referred to as inorganic growth into an aggregate forecast y(t), as follows:

$$y(t)=y_o(t)+y_i(t)$$

The organic growth can be estimated by performing a time series analysis at the model generator 170, such as the exponential smoothing described above. For the inorganic growth $y_i(t)$, in certain embodiments, the integration component 186 can be configured to forecast $y_i(t)$ using a line growth method as follows:

Estimate the lead time, l, between the anomaly in the number of enabled user time series and inorganic growth of MAU for a given country and segment combination;

Estimate the inorganic forecast cap, G, per the following formula:

G=Anomaly in enabled users increase×Conversion rate

Assume that the inorganic growth will grow uniformly between the days [l−d, l+d], where d≥0, the aggregation component can determine how long the inorganic growth would last; and Generate a linear trended forecast according to this formula, where $\hat{y}_i(t+h)$ represents the inorganic forecast generated at time t for a forecast horizon of h:

$$\hat{y}_i(t+h) = \begin{cases} 0, & \text{if } h < l - d \\ \frac{G}{2d+1} \cdot (h - l + d + 1), & \text{if } h \in [l-d, l+d] \\ G, & \text{if } h > l + d \end{cases}$$

Thus, the aggregate forecast for predicted future usage 164 at horizon h would be $\hat{y}(t+h)=\hat{y}_o(t+h)+\hat{y}_i(t+h)$.

As shown in FIG. 4, the usage predictor 172 can optionally include an update component 188 that is configured to continue monitoring the enabled user data 162 as new anomaly could happen indicating new inorganic growth. In each forecast cycle (e.g., daily or weekly), depending on if new anomalies are detected and whether inorganic MAU growth is observed, it is believed that there are four possible scenarios:

No new anomalies of enabled user data 162 and no inorganic growth of MAU—under this scenario, the update component 188 can be configured to maintain the original inorganic forecast;

No new anomalies of enabled user data 162, but inorganic growth in MAU was observed—under this scenario, the update component 188 can be configured to create a new inorganic forecast in a logistic shape with a ramp up period and a cap estimated through past anomaly information;

New anomalies of enabled user data 162 are detected but no inorganic growth of MAU—under this scenario, the update component 188 can be configured to update the estimate of the total inorganic MAU growth G which would change the peak of the inorganic forecast; and New anomalies of enabled user data 162 and inorganic growth of MAU are detected—under this scenario, the update component 188 can be configured to update the estimate of the total inorganic MAU growth G, and update the inorganic forecast with a logistic shaped forecast having a ramp up period and a cap.

The update component 188 can be configured to determine if the inorganic growth of MAU has started and the corresponding inorganic ramp up has begun by checking for any level shift in the time series. For example, when the latest observed value is relatively high (e.g., based on a threshold) compared to previous cycles, the update component 188 can indicate a level shift. An example heuristic of detecting the level shift is outlined in Algorithm 1 below. As shown in Algorithm 1, a standard time series change point detection algorithm can be applied to find if the mean of the time series has changed in the last forecast cycle (p time steps).

---

ALGORITHM 1: DETECT INORGANIC RAMP UP OR PLATEAU

Input: time series y(t), forecast cycle p in the number of time units
Output: whether y(t) is in a ramp up mode or has reached plateau 1  q ← 4p (set the default length of history to check for change points)
2  ρ ← 1.1 (set the default threshold for minimum growth rate per cycle in determining plateau)
3  d(t) ← y(t) − y(t − 1)
4  $r(t) \leftarrow \frac{y(t) - y(t-p+1)}{y(t-p+1)}$
5  $\mu \leftarrow \frac{\sum_{i=1}^{3p} d(t-q+i)}{3p}, \sigma \leftarrow \frac{1}{3p-1}\sqrt{\sum_{i=1}^{3p}(d(t-q+i)-\mu)^2}$
6  if change points detection algorithm finds level shift in y((t − p + q):t) then
7    if d(t) > μ + 2σ then
8      return ramp up detected
9    else
10     return plateau detected
11 else
12   if $\sqrt[p]{\prod_{i=1}^{p} r(t-p+i)} > \rho$ then
13     return plateau detected
14   else
15     return no change found

---

The update component 188 can also be configured to forecast when the ramp up period has begun. Based on the lead time and the estimated cap, the update component 188 can be configured to determine what time the inorganic MAU growth reaches a plateau. Since the time series is still in ramp up period at current time of forecast t, the current lead time l(t) is a positive number, and the update component 188 can predict the values during the period from (t+1) to t+l(t). Note that l(t) represents the remaining lead time at time t, and it is different from the original estimated lead time l, which was the estimated value of the lead time when the inorganic forecast is generated.

Figure 8:
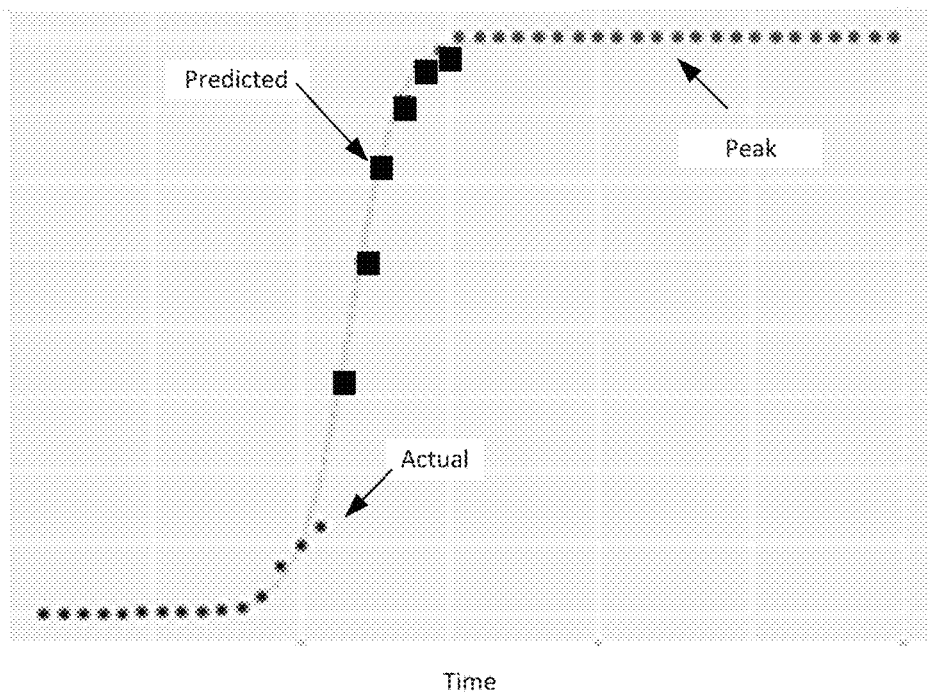
FIG. 8 is an example plot illustrating updating inorganic growth forecast in accordance with embodiments of the disclosed technology.

In certain implementation, the update component 188 can be configured to forecast the ramp up period via applying a logistic regression over the actual and future plateaued values. As shown in FIG. 8, the dashed line shows the logistic regression fitted, and the square dots indicate the predicted values for the reminder of the ramp up period. Last, the update component 188 can then rescale the predicted values so that they are in the original scale. After the inorganic growth period ends, the time series grows into a plateaued area. During such period, the inorganic forecast can transition to an organic forecast, and the update component 188 can be configured to use Algorithm 1 to determine whether the time series has plateaued.

Several embodiments of the disclosed technology can thus more accurately estimate future demand or usage levels by accounting for both seen and unseen events. By monitoring certain advance signals, such as increases in enabled users, anomalies in the advance signals can be detected. The detected anomalies 174 indicate probable inorganic growth in the active usage after certain delays. The impact of the detected anomalies 174 in advance signals can be quantified by analyzing historical data to derive conversion rates. Thus, more accurate estimate of future demand or usage forecast can be generated by combining forecast based on organic growth and forecast based on inorganic growth. As a result, risks of capacity exhaustion and resulting service interruptions can be reduced.

Figure 9A:
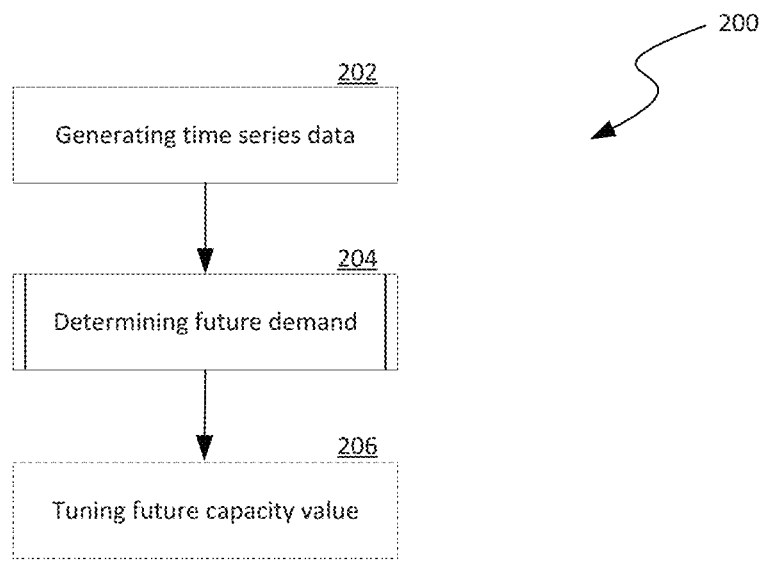
FIGS. 9A-9C are flowcharts illustrating various processes of resource provisioning forecast in a distributed computing system in accordance with embodiments of the disclosed technology.
Figure 9B:
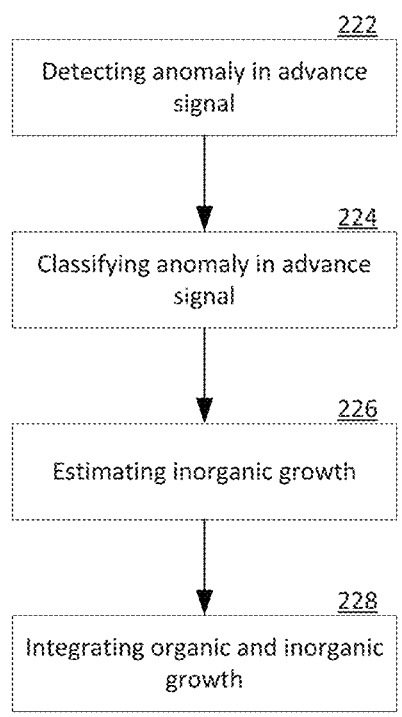

FIGS. 9A and 9B are flowcharts illustrating various processes of resource provisioning forecast in a distributed computing system in accordance with embodiments of the disclosed technology. Even though aspects of the processes are described below with reference to the distributed computing system 100 of FIGS. 1 and 2, in other embodiments, the processes can also be implemented in other computing systems with different or additional components.

As shown in FIG. 9A, the process 200 can include generating time series data at stage 202. In certain embodiments, multiple time series data can be generated. For example, time series data can be generated based on the user data 160 and based on the enabled user data 162. In other embodiments, time series data can also be generated based on user provision data or other suitable information. The process 200 can then include determining a future demand at stage 204. In certain embodiments, determining future demand can include extrapolating time series data of active usage, e.g., based on the user data 160 in FIG. 3. In other embodiments, determining future demand can also include determining a future demand because of a previously unseen event based on an advance signal. Example operations of determining a future demand because of a previously unseen event are described in more detail below with reference to FIG. 8B. Optionally, the process 200 can further include tuning future capacity values based on other suitable considerations at stage 206. Example considerations are described above with reference to FIG. 4.

As shown in FIG. 9B, example operations of determining a future demand because of a previously unseen event can include detecting an anomaly in an advance signal at stage 222. For example, enabled user data 162 can be used as an advance signal for active usage as described above with reference to FIG. 4. The example operations can also include classifying the anomaly in the advance signal at stage 224. Example operations and techniques of classifying the anomaly are described above with reference to FIG. 4. The example operations can then include estimating an inorganic growth because of a previously unseen event corresponding to the detected anomaly at stage 226. For example, a conversation rate between the inorganic growth and growth of active usage as observed in historical data can be derived. The example operations can then include integrating the organic and inorganic growth to derive an aggregate future demand or usage level at stage 228.

Figure 9C:
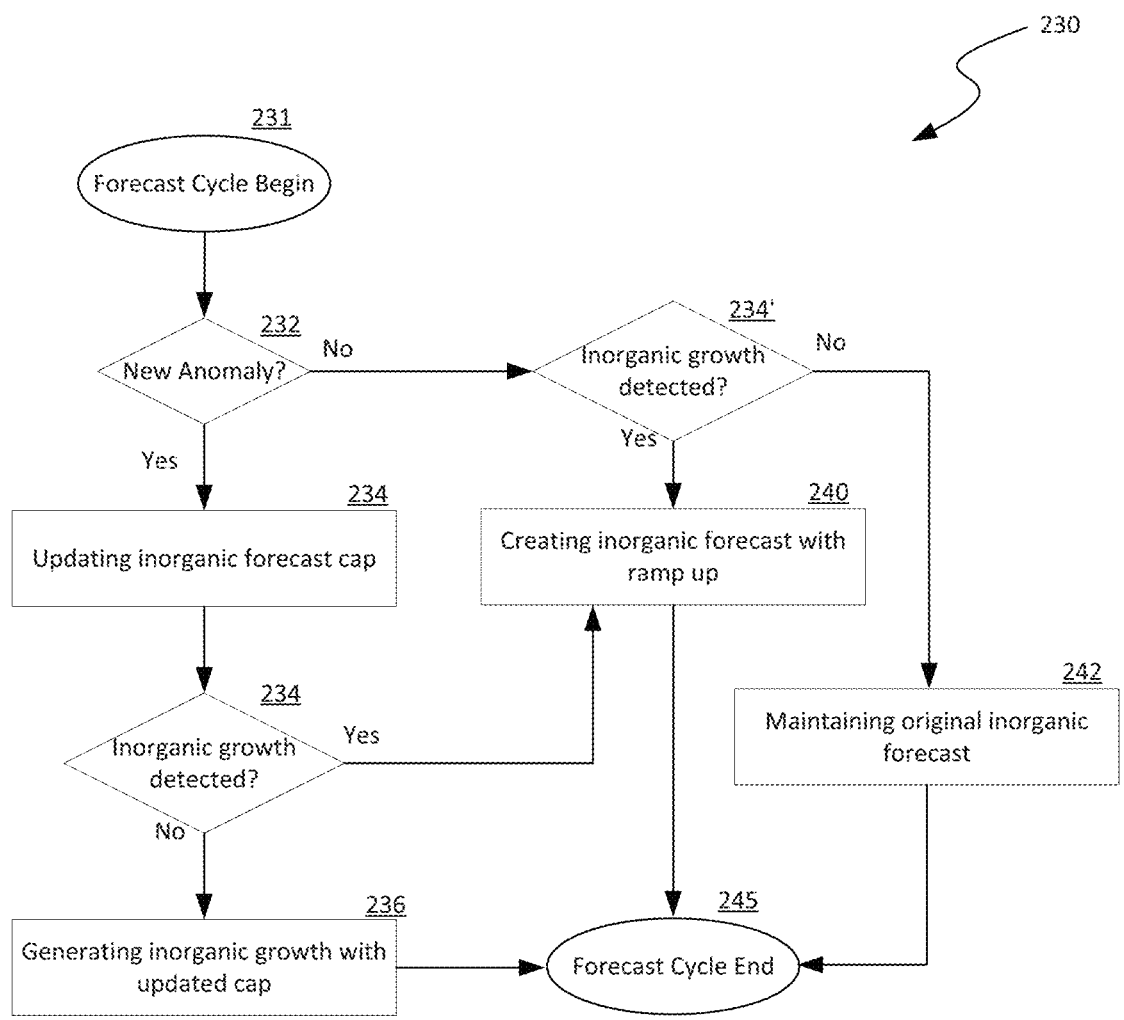

FIG. 9C illustrates an example process 230 for updating a forecast of inorganic growth in accordance with embodiments of the disclosed technology. As shown in FIG. 9C, the process 230 includes determining whether a new anomaly in an advance signal (e.g., the enabled user data 162 in FIG. 4) is detected after the forecast cycle begin at stage 231. In response to determining that a new anomaly is detected, the process 230 proceeds to updating an inorganic growth cap at stage 234. Example operations of estimating the inorganic growth cap are described above with reference to FIG. 4. The process 230 then proceeds to determining whether inorganic growth is detected at stage 234. In response to determining that no inorganic growth is detected, the process 230 proceeds to generating inorganic growth with updated cap at stage 236 before the forecast cycle ends at stage 245. Otherwise, the process 230 proceeds to creating inorganic growth forecast with ramp up at stage 240 before the forecast cycle ends at stage 245. In response to determining that no new anomaly is detected at stage 232, the process 230 proceeds to determining whether inorganic growth is detected at stage 234'. In response to determining that no inorganic growth is detected, the process 230 proceeds to maintaining the original inorganic growth forecast at stage 242 before the forecast cycle ends at stage 245. Otherwise, the process 230 proceeds to creating inorganic growth forecast with ramp up at stage 240 before the forecast cycle ends at stage 245.

Figure 10:
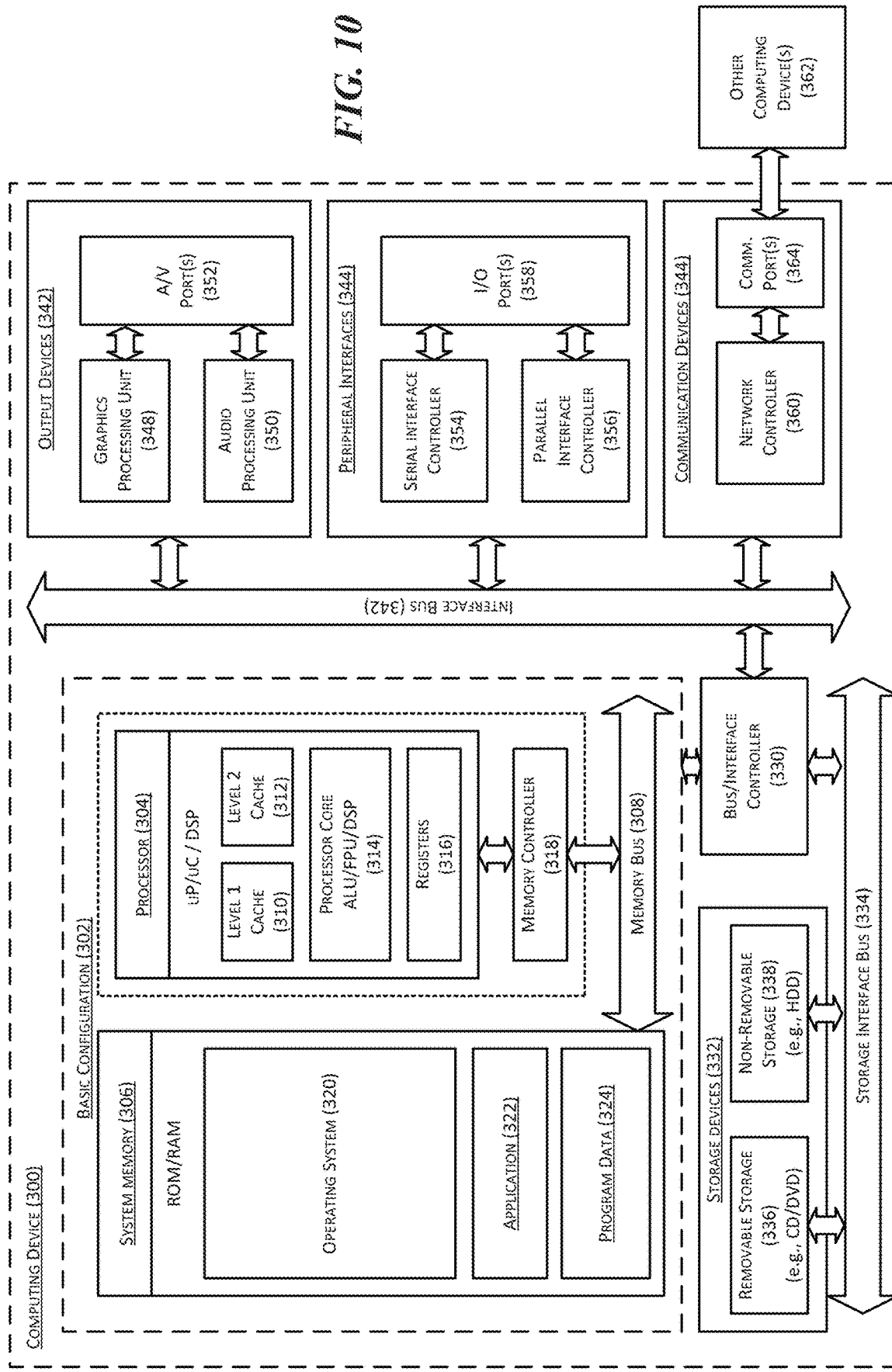
FIG. 10 is a computing device suitable for certain components of the distributed computing system in FIG. 1.

FIG. 10 is a computing device 300 suitable for certain components of the distributed computing system 100 in FIG. 1. For example, the computing device 300 can be suitable for the hosts 106, the management controller 102, the cluster controller 109, or the capacity manager 110 of FIG. 1. In a basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of resource capacity management in a distributed computing system having multiple servers interconnected by a computer network to provide a computing service to remote devices, the method comprising:
   analyzing data representing at least one of a number of enabled users or a number of provisioned users to determine whether the analyzed data represents an anomaly based on historical data of the at least one of the number of enabled users or the number of provisioned users;
   upon determining that the data represents an anomaly based on historical data of the at least one of the number of enabled users or the number of provisioned users,
      determining, using a machine learning model, a conversion rate between a change in the at least one of the number of enabled users or the number of provisioned users and a change in a number of active users of the computing service; and
      deriving a future value of the number of active users of the computing service based on both the detected anomaly and the determined conversion rate; and
   allocating and provisioning an amount of the computing resource in the distributed computing system in accordance with the determined future value of the active users of the computing resource to accommodate the change in the active users of the computing service as a result of the detected anomaly in the data representing the at least one of the number of enabled users or the number of provisioned users.

2. The method of claim 1 wherein analyzing the data includes:
   generating a time series data of changes in the at least one of the number of enabled users or the number of provisioned users; and
   developing the anomaly model to identify, based on a threshold, one or more outliers in the time series data of the changes in the at least one of the number of enabled users or the number of provisioned users.

3. The method of claim 1 wherein analyzing the data includes:
   using an anomaly model to calculate an anomaly score; and
   comparing the calculated anomaly score with a score distribution of a training dataset used to develop the anomaly model to determine whether the data representing the at least one of the number of enabled users or the number of provisioned users represents an anomaly.

4. The method of claim 1, further comprising:
upon determining that the data represents an anomaly based on historical data of the advance signal,
determining, using another machine learning model, whether the anomaly of the at least one of the number of enabled users or the number of provisioned users would result in any changes in the number of active users of the computing service; and
in response to determining that the anomaly would result in a change in the number of active users of the computing service, performing the determining the conversion rate and deriving the future value of the number of active users of the computing service.

5. A method of resource capacity management in a distributed computing system having multiple servers interconnected by a computer network to provide computing services to remote devices, the method comprising:
analyzing data representing an advance signal to determine whether the data representing the advance signal represents an anomaly based on historical data of the advance signal, the advance signal including an operating parameter of the distributed computing system, wherein changes of the operating parameter are correlated to but do not directly represent changes in demand or usage level of a computing service provided by the distributed computing system;
upon determining that the data representing the advance signal represents an anomaly based on historical data of the advance signal,
determining, using a machine learning model, a conversion rate between a change in the data representing the advance signal and a change in the demand or usage level of the computing service; and
deriving a future value of the demand or usage level of the computing service based on both the detected anomaly in the advance signal and the conversion rate; and
allocating and provisioning an amount of the computing resource in the distributed computing system in accordance with the determined future value of the demand or usage level of the computing resource to accommodate the change in the demand or usage level of the computing service as a result of the detected anomaly in the data representing the advance signal.

6. The method of claim 5 wherein analyzing the data representing the advance signal to detect the anomaly includes training a machine learning model to generate an anomaly model by:
generating a time series data of changes in the advance signal; and
developing the anomaly model to identify, based on a threshold, one or more outliers in the time series data of the changes in the advance signal.

7. The method of claim 5 wherein analyzing the data representing the advance signal to detect the anomaly includes:
using an anomaly model to calculate an anomaly score; and
comparing the calculated anomaly score with a score distribution of a training dataset used to develop the anomaly model to determine whether the data representing the advance signal represents an anomaly.

8. The method of claim 5, further comprising:
upon determining that the data representing the advance signal represents an anomaly based on historical data of the advance signal,
determining, using another machine learning model, whether the anomaly of represented by the data representing the advance signal would result in any changes in the demand or usage level of the computing service; and
in response to determining that the anomaly of represented by the data representing the advance signal would result in a change in the demand or usage level of the computing service, performing the determining the conversion rate and deriving the future value of the demand or usage level of the computing service.

9. The method of claim 5, further comprising:
upon determining that the data representing the advance signal represents an anomaly based on historical data of the advance signal,
determining, using another machine learning model, whether the anomaly of represented by the data representing the advance signal would result in any changes in the demand or usage level of the computing service; and
in response to determining that the anomaly of represented by the data representing the advance signal would not result in a change in the demand or usage level of the computing service, analyzing additional data representing the advance signal to determine whether the additional data representing the advance signal represents an anomaly based on historical data of the advance signal.

10. The method of claim 5, further comprising determining a lead time between the detected anomaly in data representing the advance signal and the change in the demand or usage level of the computing service.

11. The method of claim 5, further comprising:
generating a time series data of historical values of the demand or usage level of the computing service;
applying time series analysis on the generated time series data of the historical values of the demand or usage level of the computing service to derive another future value of the demand or usage level of the computing service; and
combining the future value of the demand or usage level of the computing service derived based on both the detected anomaly in the advance signal and the conversion rate and the another future value of demand or usage level to obtain an aggregate future value of the demand or usage level of the computing service.

12. The method of claim 5, further comprising:
generating a time series data of historical values of the demand or usage level of the computing service;
applying time series analysis on the generated time series data of the historical values of the demand or usage level of the computing service to derive another future value of the demand or usage level of the computing service; and
generating a linear trended forecast of the future value of the demand or usage level of the computing service derived based on both the detected anomaly in the advance signal and the conversion rate; and
combining the generated linear trended forecast and the another future value of demand or usage level to obtain an aggregate future value of the demand or usage level of the computing service.

13. The method of claim 5 wherein:
the demand or usage level of the computing service is measured by a value of monthly active user; and the advance signal includes a number of provisioned users or a number of enabled users of the computing service.

14. A computing device of automated capacity management, comprising:
- a processor; and
- a memory operatively coupled to the processor, the memory having instructions executable by the processor to cause the computing device to:
  - analyze data representing an advance signal to determine whether the data representing the advance signal represents an anomaly based on historical data of the advance signal, the advance signal including an operating parameter of the distributed computing system, wherein changes of the operating parameter are correlated to but do not directly represent changes in demand or usage level of a computing service provided by the distributed computing system;
  - upon determining that the data representing the advance signal represents an anomaly based on historical data of the advance signal,
    - determine, using a machine learning model, a conversion rate between a change in the data representing the advance signal and a change in the demand or usage level of the computing service; and
    - derive a future value of the demand or usage level of the computing service based on both the detected anomaly in the advance signal and the conversion rate; and
  - allocate an amount of the computing resource in the distributed computing system in accordance with the determined future value of the demand or usage level of the computing resource to accommodate the change in the demand or usage level of the computing service as a result of the detected anomaly in the data representing the operating parameter.

15. The computing device of claim 14 wherein to analyze the data representing the advance signal to detect the anomaly includes to train a machine learning model to generate an anomaly model by:
- generating a time series data of changes in the advance signal; and
- developing the anomaly model to identify, based on a threshold, one or more outliers in the time series data of the changes in the advance signal.

16. The computing device of claim 14 wherein to analyze the data representing the advance signal to detect the anomaly includes to:
- use an anomaly model to calculate an anomaly score; and
- compare the calculated anomaly score with a score distribution of a training dataset used to develop the anomaly model to determine whether the data representing the advance signal represents an anomaly.

17. The computing device of claim 14 wherein the memory includes additional instructions executable by the processor to cause the computing device to:
- upon determining that the data representing the advance signal represents an anomaly based on historical data of the advance signal,
  - determine, using another machine learning model, whether the anomaly of represented by the data representing the advance signal would result in any changes in the demand or usage level of the computing service; and
  - in response to determining that the anomaly of represented by the data representing the advance signal would result in a change in the demand or usage level of the computing service, perform the determining the conversion rate and deriving the future value of the demand or usage level of the computing service.

18. The computing device of claim 14 wherein the memory includes additional instructions executable by the processor to cause the computing device to determine a lead time between the detected anomaly in data representing the advance signal and the change in the demand or usage level of the computing service.

19. The computing device of claim 14 wherein to the memory includes additional instructions executable by the processor to cause the computing device to:
- generate a time series data of historical values of the demand or usage level of the computing service;
- apply time series analysis on the generated time series data of the historical values of the demand or usage level of the computing service to derive another future value of the demand or usage level of the computing service; and
- combine the future value of the demand or usage level of the computing service derived based on both the detected anomaly in the advance signal and the conversion rate and the another future value of demand or usage level to obtain an aggregate future value of the demand or usage level of the computing service.

20. The computing device of claim 14 wherein to the memory includes additional instructions executable by the processor to cause the computing device to:
- generate a time series data of historical values of the demand or usage level of the computing service;
- apply time series analysis on the generated time series data of the historical values of the demand or usage level of the computing service to derive another future value of the demand or usage level of the computing service; and
- generate a linear trended forecast of the future value of the demand or usage level of the computing service derived based on both the detected anomaly in the advance signal and the conversion rate; and
- combine the generated linear trended forecast and the another future value of demand or usage level to obtain an aggregate future value of the demand or usage level of the computing service.

* * * * *